United States Patent
Holt

(10) Patent No.: US 11,787,714 B2
(45) Date of Patent: Oct. 17, 2023

(54) METHOD FOR GELATION OF A WASTE WATER STREAM

(71) Applicant: Martlin Distributing, LLC, Carnegie, PA (US)

(72) Inventor: Jason Kenneth Holt, Milton, GA (US)

(*) Notice: Subject to any disclaimer, the term of this patent is extended or adjusted under 35 U.S.C. 154(b) by 0 days.

(21) Appl. No.: 17/237,306

(22) Filed: Apr. 22, 2021

(65) Prior Publication Data

US 2021/0331951 A1 Oct. 28, 2021

Related U.S. Application Data

(60) Provisional application No. 63/013,664, filed on Apr. 22, 2020.

(51) Int. Cl.
 *C02F 1/56* (2023.01)
 *C02F 1/52* (2023.01)
 *C02F 11/13* (2019.01)
 *C02F 103/06* (2006.01)

(52) U.S. Cl.
 CPC .............. *C02F 1/56* (2013.01); *C02F 1/5236* (2013.01); *C02F 1/5272* (2013.01); *C02F 11/13* (2019.01); *C02F 2103/06* (2013.01)

(58) Field of Classification Search
 CPC ........................................................ C02F 1/56
 See application file for complete search history.

(56) References Cited

U.S. PATENT DOCUMENTS

| 3,082,173 A | * | 3/1963 | Horvitz ................. C02F 1/5236 210/731 |
| 2004/0151548 A1 | | 8/2004 | Hardin et al. |
| 2006/0222464 A1 | | 10/2006 | Schwalbe |
| 2007/0003370 A1 | | 1/2007 | Liao et al. |
| 2011/0232532 A1 | | 9/2011 | Ramme et al. |
| 2012/0012525 A1 | | 1/2012 | Kuang et al. |
| 2013/0313195 A1 | | 11/2013 | Townsend et al. |
| 2014/0299549 A1 | | 10/2014 | Cataldo |
| 2015/0060358 A1 | | 5/2015 | Bleggi |
| 2017/0190596 A1 | | 7/2017 | Breeden |
| 2018/0162759 A1 | | 6/2018 | Kashtiara |
| 2018/0282193 A1 | | 10/2018 | Kudrjawzew |
| 2019/0263698 A1 | | 8/2019 | Liu et al. |
| 2020/0039851 A1 | * | 2/2020 | Mundheim ............ A01N 59/16 |

FOREIGN PATENT DOCUMENTS

WO WO-2006123081 A1 * 11/2006 ............... B09B 3/00

* cited by examiner

*Primary Examiner* — Peter Keyworth
(74) *Attorney, Agent, or Firm* — Blynn L. Shideler; Krisanne Shideler; BLK Law Group

(57) ABSTRACT

A method for gelation of a waste water stream comprising the steps of: Introducing water soluble, crosslinkable polysaccharide into a waste water stream to form a treated stream having an initial liquid content; and drying the treated stream to remove at least 50% by weight of the initial liquid content in the treated stream. The treated waste stream may be solidified to pass the paint test.

14 Claims, No Drawings

METHOD FOR GELATION OF A WASTE WATER STREAM

RELATED APPLICATIONS

The present application claims the benefit of U.S. Provisional Patent Application Ser. No. 63/013,664 filed Apr. 22, 2020 titled "Method of Treating Waste Water Streams" which is incorporated herein by reference.

BACKGROUND OF THE INVENTION

1. Field of the Invention

This invention generally relates to liquid stream treatment, more specifically to methods of treating waste water streams and specifically to methods of solidifying waste water streams.

2. Background Information

Waste water is generally broadly defined as used water from any combination of domestic, industrial, commercial or agricultural activities, surface runoff or stormwater, and any sewer inflow or sewer infiltration. Waste water is also defined as a byproduct of domestic, industrial, commercial or agricultural activities. A leachate, within the meaning of this application, is a sub-set of waste water and is any liquid that, in the course of passing through matter, extracts soluble or suspended solids, or any other component of the material through which it has passed. Leachate is a widely used term in the environmental sciences where it has the specific meaning of a liquid that has dissolved or entrained often environmentally harmful substances that may then enter the environment. It is commonly used in the context of landfilling of putrescible or industrial waste. Ground leachate, as defined herein, is leachate that has flowed, at least partially, through the ground surface, such as through a landfill or mine residue. Landfill leachate is a leachate that flow through a landfill As the world's population grows the treatment of waste water streams is becoming an increasingly important concern worldwide. Beginning in 1972 with the Clean Water Act, the United States substantially increased government regulations on the treatment of liquids such as leachate and waste water streams.

Waste collection sites or landfills are, of course, well known and unavoidable requirements of today's societal structures. According to the University of Florida from 2013, researchers estimate that between 900 million to 9 billion gallons of landfill leachate are produced annually in the United States. It seems obvious that this volume of wastewater raises environmental and economic concerns. One of the main problems of municipal solid waste landfills concerns the collection and, in particular, the disposal of, the landfill leachate.

Bioreactor landfills have previously been used to modify solid waste landfills by re-circulating and injecting the landfill leachate to enhance the consolidation of waste and reduce the time required for landfill stabilization. A liner is commonly provided at the bottom of the site to trap leachate which has run through the collected waste above. See, for example, a leachate collection system described in U.S. Publication No. 2006-0222464. Some include pipes to collect the landfill leachate and draw it out for re-circulation. For details on one such distribution and recirculation system see U.S. Patent publication 2004-0151548. However, there have been substantial questions regarding the effectiveness of such landfill leachate recirculation systems and current environmental regulations (and likely future ones) typically prevent dumping untreated leachate liquid back into the existing landfill.

Certain landfill leachate treatment regimens have been proposed. For example U.S. Patent publication 2007-0003370 teaches a method for treating landfill leachate comprising the steps of (a) "coagulatively settling" of landfill leachate to produce a supernatant liquid; (b) filtering the supernatant liquid through a filtration device to produce a first filtered liquid; (c) filtering the first filtered liquid in a reverse osmosis apparatus to produce a second filtered liquid; and (d) treating the second filtered liquid with a chlorine-based oxidant.

Chinese Patent Application No. CN1478737A discloses a treatment of landfill leachate that includes removing ammonia nitrogen compounds present in the landfill leachate by electrolysis; degrading the landfill leachate biologically with activated sludge in conjunction with filtration through a hollow fiber membrane (MBR/CMF methods); reverse osmosis; and final purification to meet the various standards for water consumption.

U.S. Patent publication 2011-0232532 teaches a method for repurposing landfill leachate as a component in a settable building material composition. The method includes using from 1% to 30% by weight of an activator, from 1% to 55% by weight of a pozzolan, such as fly ash; from 40% to 90% by weight of an aggregate; and liquid landfill leachate in a sufficient amount such that the composition sets to a building material having a compressive strength of at least 2 MPa. This repurposed landfill leachate product has not yet been widely commercially accepted.

U.S. Patent publication 2012-0012525 discloses a refuse landfill leachate wastewater treatment system comprising a collection well, an adjustment tank, a filter, a comprehensive treatment system having a multi-stage anoxic/aerobic pool and a membrane biological reactor.

U.S. Patent publication 2013-0313195 discloses landfill leachate treating membrane system, comprising: a first stage including reverse osmosis membranes and/or nano-filtration membranes, wherein a landfill leachate is introduced to the first stage to separate the landfill leachate into a first stage concentrate and a first stage permeate; and a second stage including reverse osmosis membranes and/or nano-filtration membranes, wherein the first stage and the second stage are in fluidic communication, wherein the first stage permeate is introduced to the second stage to separate the first stage permeate into a second stage concentrate and a second stage permeate.

U.S. Patent publication 2014-0299549 discloses a process for the treatment of landfill leachate wastewater having a high COD, comprising: taking aliquots of the wastewater from the landfill and mixing them with active charcoal at room temperature, filtering the mixture to obtain an eluate, carrying out a photo-ozonolysis treatment consisting in the simultaneous irradiation with UV-light and saturation with ozone of the eluate.

U.S. Patent publication 2015-0060358 discloses a flash flocculation tank system having a plurality of tanks and a plurality of settling spheres that are magnetic and treat wastewater and/or landfill leachate.

U.S. Patent publication 2017-0190596 discloses a process for treating, reducing and/or disposing of leachate created by a landfill system by aerating, spraying and/or stripping leachate in a controlled environment to promote evaporation of a water component of the leachate, to strip a portion of ammonia from the leachate and/or to promote biological decomposition of the leachate.

U.S. Patent publication 2018-0162759 discloses a system for allegedly reducing pollutants in a landfill leachate, comprising: a screening module configured to filter the leachate by a filter; a pH adjustment and mixing module configured to determine and adjust the pH of the filtered leachate to a predefined value, wherein the leachate of predefined pH value is mixed with a chemical composition comprising, a mixture of iron oxide nanoparticles, aluminum oxide nanoparticles, titanium oxide nanoparticles and titanium oxide nanoparticles, by ultrasonic waves for a predetermined time, and wherein the pollutants in the leachate are allegedly adsorbed by the composition to provide a "purified leachate", a separator module configured to allow the "purified leachate" and the pollutant adsorbed composition via a magnetic field to separate the pollutant adsorbed composition from the purified leachate; and a disinfection module configured to filter and disinfect the purified leachate to produce an alleged "pure water".

U.S. Patent publication 2018-0282193 discloses a system for landfill leachate treatment by "oxyammonolysis" that includes (i) insertion of the treated material into a stirred reactor until 60% of its volume is filled and mixed with ferric chloride from 0.35% to 0.70% by volume of the reactor, then the mixture is shaken at 40 rpm for five minutes to coagulate; then added is an anionic flocculating polymer followed later by an cationic flocculating polymer; the resulting mixture rests and is then transferred to a flotation tank by dissolved air; (ii) filtration of a liquid fraction from the flotation tank in a sand filter, followed by a microfiltration and a nanofiltration resulting in a nanofiltration permeate and a retentate of the nanofiltration; (iii) oxyammonolysis wherein the nanofiltration permeate is transferred to an aeration tank and ozone is injected to such tank resulting in an oxidized effluent which is transferred to an ammonolysis conduit where it is subjected to the electric potential difference until reaches the concentration of 3 mg/L of ammonium nitrogen obtaining an effluent, said effluent is then pumped to a press filter for retention of ionic residues, iron and nitrogen.

U.S. Patent publication 2019-0263698, from FuZhou University, discloses a method of processing landfill leachate to form a thinning ceramic additive that improves ceramic binding. U.S. Patent publication 2019-0263698, also from FuZhou University, discloses a method of processing landfill leachate to form an industrial briquette. These repurposing of landfill leachate techniques have not yielded wide commercial acceptance.

The above mentioned patent publications are incorporated herein by reference. Whether it is cost or efficacy, or combination of both, none of the above solutions has eliminated the issue and there remains a need in the art to a simple cost effective treatment for wastewater, particularly landfill leachate.

SUMMARY OF THE INVENTION

The various embodiments and examples of the present invention as presented herein are understood to be illustrative of the present invention and not restrictive thereof and are non-limiting with respect to the scope of the invention.

One example of the present invention provides a method for gelation of a waste water stream comprising the steps of: Introducing water soluble, crosslinkable polysaccharide into a waste water stream to form a treated stream having an initial liquid content; and drying the treated stream to remove at least 50% by weight of the initial liquid content in the treated stream. The treated waste stream may be solidified to pass the paint test.

The method for gelation of a waste water stream according to one embodiment of the invention provides wherein the water soluble, crosslinkable polysaccharide is one of a galactomannan, carrageenan, xanthan gum and combinations thereof. The method for gelation of a waste water stream according to one aspect of the invention may provide wherein the water soluble, crosslinkable polysaccharide includes galactomannan. Specifically the method for gelation of a waste water stream according to one specific embodiment of the invention may provide wherein the water soluble, crosslinkable polysaccharide is guaran (guar gum).

The method for gelation of a waste water stream according to one aspect of the invention may provide wherein the water soluble, crosslinkable polysaccharide is formed as a suspension in a carrier liquid. The carrier liquid may be a hydrocarbon oil, such as mineral oil or a vegetable oil.

The method for gelation of a waste water stream according to one aspect of the invention may provide wherein the water soluble, crosslinkable polysaccharide is placed in an aqueous solution prior to introduction into a waste water stream.

On example of the present invention provides a method for gelation of a landfill leachate waste water stream comprising the steps of: Introducing water soluble, crosslinkable polysaccharide into a landfill leachate waste water stream to form a treated stream having an initial liquid content wherein the polysaccharide is added into the waste water stream in amounts between about 0.1% and about 10% of the polysaccharide to the weight of the treated stream; and Drying the treated stream to remove at least 50% by weight of the initial liquid content in the treated stream, wherein the drying is an accelerated drying process.

One example of the present invention provides a method of treating a waste water stream, such as landfill leachate, comprising the steps of: introducing water soluble, crosslinkable polysaccharide into a waste water stream; and introducing a source of borate ions for crosslinking the polysaccharide. The method of treating a waste water stream according to the present invention may be conducted wherein the step of introducing a source of borate ions for crosslinking the polysaccharide is subsequent to the step of introducing water soluble, crosslinkable polysaccharide into a waste water stream, or prior to the step of introducing water soluble, crosslinkable polysaccharide into a waste water stream, or simultaneous with the step of introducing water soluble, crosslinkable polysaccharide into a waste water stream. The method of treating a waste water stream according to the invention may provide wherein the source of borate ions is boric acid or salts thereof.

A specific embodiment of the present invention provides a method of treating a landfill leachate stream comprising the steps of: introducing guar gum into a landfill leachate stream; Subsequent to the introduction of guar gum into a landfill leachate stream, introducing a boric acid to the landfill leachate stream sufficient to have the treated stream pass the paint filter test.

These and other advantages of the present invention will be clarified in the description of the preferred embodiments taken together with the attached figures.

DESCRIPTION OF THE PREFERRED EMBODIMENTS

The present invention provides a method for gelation of a waste water stream comprising the steps of: Introducing water soluble, crosslinkable polysaccharide into a waste water stream to form a treated stream having an initial liquid content; and drying the treated stream to remove at least 50% by weight of the initial liquid content in the treated stream. The treated waste stream may be solidified to pass the paint test. Gelation within the meaning of this specification is the formation of a gel and may be considered a subset of solidification. Gelation is promoted by gelling agents. Gelation, as defined herein, can occur either by physical linking or by chemical crosslinking. A gel, as defined herein is a semi-solid which will exhibits no flow when in the steady-state, and in the context of the present invention will pass the paint filter liquid test. Some restrictive definitions of gels define limits on yield stress or ratios of liquids to solids content, and these definitions are not used herein as the gelation process of the present invention may be used to form a final gel product that is solidified beyond these more restrictive gel definitions. Thus the present invention defines a gel as at least semi-solid which will pass the paint filter liquid test.

The Paint filter liquid test is the US EPA approved test method (EPA 9095B) to determine the presence of free liquids in a representative sample of waste, and within this application references the test as described on Apr. 1, 2020. It is referenced in the regulations pertaining to hazardous waste landfills (40 CFR 264.314 and 265.314) since free liquids are forbidden from landfill disposal, unless exempted. The paint filter test method is also used to identify the presence of free liquids in the determination of the hazardous characteristics of Ignitability (D001) and Corrosivity (D002). In the Paint Filter Liquids Test Method 9095B a 100 mL or 100 g representative sample of the substance of interest is placed in a paint filter, wherein the paint filter is a standard conical paint filter [60 +/−5% (fine meshed size)]. If any portion of the material passes through and drops from the filter within the 5-min test period, the material is deemed to contain free liquids (failure). If any portion contains free liquids then the entire samples is considered to have free liquids. The test must be performed above the freezing point of any liquid in the sample and can, but is not required to, exceed room temperature of 25° C.

The gelling agent, also called a thickening agent, of the present invention is the water soluble, crosslinkable polysaccharide discussed herein. The crosslinking of the polysaccharide will further facilitate this process whereby the crosslinking agent may broadly be referenced as gelling agents.

The water soluble, crosslinkable polysaccharide may be one of galactomannans, carrageenans, xanthan gums and combinations thereof. The polysaccharide is added into the waste water stream in amounts between about 0.1% and about 10% of the polysaccharide to the weight of the treated stream. The term "about" within the present application means +/−10% unless otherwise stated. The method for gelation of a waste water stream according to a preferred embodiment of the invention provides wherein the polysaccharide is added into the waste water stream in amounts between about 1% and about 3% of the polysaccharide to the weight of the treated stream.

Galactomannans are polysaccharides consisting of a mannose backbone with galactose side groups (more specifically, a (1-4)-linked beta-D-mannopyranose backbone with branchpoints from their 6-positions linked to alpha-D-galactose, (i.e. 1-6-linked alpha-D-galactopyranose). In order of increasing number of mannose-to-galactose ratio:[1] fenugreek gum, mannose:galactose ~1:1; guar gum, mannose:galactose ~2:1; tara gum, mannose:galactose ~3:1; locust bean gum or carob gum, mannose:galactose ~4:1; and cassia gum, mannose:galactose ~5:1.

Fenugreek gum comes from the Fenugreek plant is an annual plant in the family Fabaceae, with leaves consisting of three small obovate to oblong leaflets. It is cultivated worldwide as a semiarid crop. Its seeds and leaves are common ingredients in dishes from the Indian subcontinent.

Guar gum, also called guaran, is extracted from guar beans that has widely used in food, feed, and industrial applications. The guar seeds are mechanically dehusked, hydrated, milled and screened according to application. It is typically produced as a free-flowing, off-white powder. Guaran is the preferred polysaccharide of the present invention because it is easily available, efficient, and cost effective. In landfill leachate being treated to pass the paint filter test the effective amounts of guaran are in the range of 0.1%-50% by weight of leachate to be treated. As discussed in detail below, the guaran may be held in a carrier and diluted before introduction to the waste water stream being treated.

Tara gum is a white or beige, nearly odorless powder that is produced by separating and grinding the endosperm of *T. spinosa* seeds. *Tara spinosa*, commonly known as tara is a small leguminous tree or thorny shrub native to Peru. The major component of the gum is a galactomannan polymer similar to the main components of guar and locust bean gums that are used widely in the food industry. Tara gum has also been deemed safe for human consumption as a food additive.

Locust bean gum (LBG, also known as carob gum, carob bean gum, carobin, is a galactomannan vegetable gum extracted from the seeds of the carob tree and used widely in food technology.

The term cassia gum refers to the flour made from the endosperms of the seeds of *Senna obtusifolia* and *Senna tora* (also called *Cassia obtusifolia* or *Cassia tora*).

Carrageenans or carrageenins are a family of linear sulfated polysaccharides that are extracted from red edible seaweeds. They are widely used in the food industry, particulalry in dairy and meat products, due to their strong binding to food proteins. There are three main varieties of carrageenan, which differ in their degree of sulfation. Kappa-carrageenan has one sulfate group per disaccharide, iota-carrageenan has two, and lambda-carrageenan has three.

Xanthan gum is a polysaccharide with many industrial uses, including as a common food additive. It is an effective thickening agent and stabilizer to prevent ingredients from separating. It can be produced from simple sugars using a fermentation process, and derives its name from the species of bacteria used, *Xanthomonas campestris*.

The waste water stream may be a leachate, particularly a ground leachate and more specifically a landfill leachate. Landfill leachate varies widely in composition depending on the age of the landfill and the type of waste that it contains. It usually contains both dissolved and suspended material. The generation of leachate is caused principally by precipitation such as rain permeating through waste deposited in a landfill. Once in contact with decomposing solid waste, the permeating water becomes contaminated, and when it subsequently flows out of the waste material it is termed leachate. Additional leachate volume is produced during this decomposition of carbonaceous material, producing a wide range of other materials including methane, carbon dioxide and a complex mixture of organic acids, aldehydes, alcohols and simple sugars. The present method may be on landfill leachate and the preferred implementation of the method of handling collected landfill leachate according to the present invention is on-site treatment. When treating leachate on-site, the leachate may pumped from the sumps into separate treatment tanks.

Properly designed and engineered landfill sites are generally constructed with impermeable liners made of geomembranes or engineered clay. The use of linings is now mandatory within the United States, Australia and the European Union (except where the waste is deemed inert). In addition, most toxic and difficult materials are now specifically restricted from landfilling. However, despite much stricter statutory controls, landfill leachates from modern sites are often found to contain a range of contaminants stemming from illegal activity or legally discarded household and domestic products.

When water permeates through waste, it promotes and assists the process of decomposition by bacteria and fungi. These processes in turn release by-products of decomposition and rapidly use up any available oxygen, creating an anoxic environment. In actively decomposing waste, the temperature rises and the pH falls rapidly with the result that many metal ions that are relatively insoluble at neutral pH become dissolved in the developing leachate. The decomposition processes themselves release more water, which adds to the volume of leachate. Leachate also reacts with materials that are not prone to decomposition themselves, such as fire ash, cement-based building materials and gypsum-based materials changing the chemical composition. In sites with large volumes of building waste, especially those containing gypsum plaster, the reaction of leachate with the gypsum can generate large volumes of hydrogen sulfide, which may be released in the leachate and may also form a large component of the landfill gas. The physical appearance of leachate when it emerges from a typical landfill site is a black-, yellow- or orange-colored cloudy liquid. The smell is acidic and offensive and may be very pervasive because of hydrogen-, nitrogen- and sulfur-rich organic species such as mercaptans.

In a landfill that receives a mixture of municipal, commercial, and mixed industrial waste but excludes significant amounts of concentrated chemical waste, landfill leachate may be characterized as a water-based solution of four groups of contaminants: dissolved organic matter (alcohols, acids, aldehydes, short chain sugars etc.), inorganic macro components (common cations and anions including sulfate, chloride, iron, aluminum, zinc and ammonia), heavy metals (Pb, Ni, Cu, Hg), and xenobiotic organic compounds such as halogenated organics, (PCBs, dioxins, etc.). A number of complex organic contaminants have also been detected in landfill leachates.

Regarding the leachate collection, natural and synthetic liners may be utilized as both a collection device and as a means for isolating leachate within the fill to protect the soil and groundwater below. The chief concern is the ability of a liner to maintain integrity and impermeability over the life of the landfill. Subsurface water monitoring, leachate collection, and clay liners are commonly included in the design and construction of a waste landfill. To effectively serve the purpose of containing leachate in a landfill, a liner system must possess a number of physical properties. The liner must have high tensile strength, flexibility, and elongation without failure. It is also important that the liner resist abrasion, puncture, and chemical degradation by leachate. Lastly, the liner must withstand temperature variation and be black (to resist UV light), easily installed, and economical.

There are several types of liners used in leachate control and collection. These types include geomembranes, geosynthetic clay liners, geotextiles, geogrids, geonets, and geocomposites. Each style of liner has specific uses and abilities. The leachate drainage system is responsible for the collection and transport of the leachate collected inside the liner. The pipe dimensions, type, and layout must all be planned with the weight and pressure of waste, and transport vehicles in mind. The pipes are located on the floor of the cell. Above the network lies an enormous amount of weight and pressure. To support this, the pipes can either be flexible or rigid, but the joints to connect the pipes yield better results if the connections are flexible. An alternative to placing the collection system underneath the waste is to position the conduits in trenches or above grade.

The collection pipe network of a leachate collection system drains, collects, and transports leachate through the drainage layer to a treatment sump. The pipes also serve as drains within the drainage layer to minimize the mounding of leachate in the layer. These pipes are generally designed with cuts that are inclined to 120 degrees, preventing entry of solid particles. A filter layer may be used above the drainage layer in leachate collection. There are two types of filters typically used in engineering practices: granular and geotextile. Granular filters consist of one or more soil layers or multiple layers having a coarser gradation in the direction of the seepage than the soil to be protected.

As liquid enters the landfill cell, it moves down the filter, passes through the pipe network, and rests in the treatment sump. As collection systems are planned, the number, location, and size of the treatment sumps are vital to an efficient operation. When designing treatment sumps, the amount of leachate and liquid expected is the foremost concern. Areas in which rainfall is higher than average typically have larger sumps. A further criterion for sump planning is accounting for the pump capacity. The relationship of pump capacity and sump size is inverse. If the pump capacity is low, the volume of the sump should be larger than average. It is critical for the volume of the sump to be able to store the expected leachate between pumping cycles. This relationship helps maintain a healthy operation. Sump pumps can function with preset phase times. If the flow is not predictable, a predetermined leachate height level can automatically switch the system on.

The collection pipes typically convey the leachate by gravity to one or more treatment sumps, depending upon the size of the area drained. The landfill cell, filter leachate collection and leachate sumps are all well known in the art. Leachate collected in the sump is treated in accordance with the principles of the present invention.

Drying within the scope of the present invention means removal of at least 50% by weight of the initial liquid content in the treated stream. This could generally be called a dehydration process, but the stream may include volatile organic liquids, such that the term "drying" is more accurate.

The drying process may be natural or accelerated. A natural drying process within the meaning of this application includes simply leaving the treated stream at ambient conditions (typically about 60-100° F.; i. e., 15.6-32.2° C.) until evaporation removes at least 50% by weight of the initial liquid content in the treated stream. Natural drying can include spreading of the treated stream on a bed or belt to increase the area of the surface exposed to air and/or placing the stream under solar radiation (e.g., a greenhouse type environment). The natural drying may be performed on a filter or sieve also known as a gravity belt.

The accelerated drying process within the meaning of this application includes the addition of one or more of heat (including microwave or other non-solar radiation sources), drying medium (e.g., forced dry air), agitation/tumbling (e.g. drum dryer or centrifuge, or paddle dryer), and pressure (e.g. progressive compression type belts).

One preferred accelerated drying process is adding the treated stream to a heated oil bath for a direct heat transfer. The heated oil bath is preferably at least 90° C. and more preferably at least 100° C. The dried, gelled product may be skimmed from the oil bath after removal of at least 50% by weight of the initial liquid content in the treated stream, preferably at least 60% by weight of the initial liquid content in the treated stream, more preferably at least 70% by weight of the initial liquid content in the treated stream. The process can be used to efficiently remove 80-90% by weight of the initial liquid content in the treated stream. This method may possibly utilize materials, oils for the oil bath that are native in the landfill environment.

Another preferred accelerated drying process is conveying the treated stream on a conveyor, over which dry (low humidity) heated air is forced. The conveyor may also be heated to facilitate the process. The accelerated drying processes described herein may be combined; for example the treated stream may be transported on a conveyor over which dry, heated air is forced as it is being transported to a heated oil bath discussed above, and the skimmed product further dried on a conveyor to yield the final gelled product.

Another preferred accelerated drying process is conveying the treated stream into a tumble dryer, which may include introducing dry, heated air to enhance the drying process.

Another preferred accelerated drying process is conveying the treated stream through progressive compression belts, which may be heated, to mechanically force remaining liquid out of the treated stream.

Another preferred accelerated drying process is known as paddle drying with heated paddles. Paddle drying often uses hot water, steam, or heat-conducting oil as a heat source for indirect heat exchange.

Another preferred accelerated drying process is known as microwave drying in which microwave energy is added to heat the stream, although the cost of this technique can be a concern.

As noted above these accelerated drying processes may also be used in combination and the dried, gelled product will have removed at least 50% by weight of the initial liquid content in the treated stream, preferably removed at least 60% by weight of the initial liquid content in the treated stream, more preferably removed at least 70% by weight of the initial liquid content in the treated stream. The processes of the invention can be utilized wherein the final gelled product has had 80-90% by weight of the initial liquid content in the treated stream removed.

The method of gelation of a waste water stream of the invention may further include the addition another gelling agent namely a crosslinking agent, specifically further including introducing a source of borate ions as a crosslinking agent for crosslinking the polysaccharide. As an alternative embodiment the present invention may be considered as a method of treating a waste water stream comprising the steps of introducing a water soluble, crosslinkable polysaccharide, generally an effective amount, into a waste water stream; and introducing a source of borate ions as a crosslinking agent for crosslinking the polysaccharide. As detailed below, the step of introducing a source of borate ions for crosslinking the polysaccharide is subsequent to the step of introducing water soluble, crosslinkable polysaccharide into a waste water stream, or prior to the step of introducing water soluble, crosslinkable polysaccharide into a waste water stream, or simultaneous with the step of introducing water soluble, crosslinkable polysaccharide into a waste water stream. The process of introducing the water soluble, crosslinkable polysaccharide and the crosslinking agent (collectively the additives) may include actively mixing the waste water stream and the additives, whether the additives are sequentially introduced or introduced simultaneously. This alternative method may or may not include the drying step discussed above.

As discussed above the preferred implementation of the method of handling collected landfill leachate according to the present invention is on-site treatment. When treating leachate on-site, the leachate may pumped from the sumps into separate treatment tanks. The leachate may then be mixed with water soluble, crosslinkable polysaccharide, generally an effective amount, into a waste water stream; and subsequent to the introduction of the water soluble, crosslinkable polysaccharide into a waste water stream, introducing a source of borate ions for crosslinking the polysaccharide. An effective amount of water soluble, crosslinkable polysaccharide will be an amount sufficient to advantageously increase the viscosity of the treated stream, following crosslinking, for solidification or gelation of the treated stream. Preferably the polysaccharide is added into the waste water stream in amounts between about 0.1% and about 10% of the polysaccharide to the weight of the treated stream. The introduction of the effective amount of water soluble, crosslinkable polysaccharide with the treated stream may include an active continuous mixing, such as utilizing a mixing conveyor.

The method of treating a waste water stream according to invention provides wherein a preferred source of borate ions is boric acid or salts thereof. When using boric acid effective amounts are those that provide sufficient crosslinking to the water soluble, crosslinkable polysaccharide to achieve the desired change in viscosity. The introduction of the effective amount of boric acid or salts thereof with the treated stream may include an active continuous mixing, such as utilizing a mixing conveyor. In the case of landfill leachate this would be sufficient to pass the paint filter test. In such landfill leachate applications where guar gum is used, the amount of boric acid used is in the range of 0.1%-50% by weight of leachate to be treated.

The process may provide the sequential introduction of the water soluble, crosslinkable polysaccharide and the source of borate ions for crosslinking the polysaccharide. This should be easily understood to indicate that crosslinking cannot occur until both are present in the treated mixture. It is possible to have a simultaneous introduction of the water soluble, crosslinkable polysaccharide and the source of borate ions for crosslinking the polysaccharide, such as where a carrier is provided that prevents the premature crosslinking from occurring in significant amounts.

The method of treating a waste water stream according to the present invention may provide that the water soluble, crosslinkable polysaccharide is formed as a suspension in a carrier liquid, namely a hydrocarbon oil such as mineral oil or vegetable oil. Suitable vegetable oils include any of palm oil, coconut oil, canola oil, soybean oil, sunflower oil, rapeseed oil, peanut oil, olive oil, cottonseed oil, corn oil, grapeseed oil, hazelnut oil, linseed oil, rice bran oil, safflower oil, acai palm oil, jambu oil, sesame oil, graviola oil, tucuma oil, brazil nut oil, carapa oil, buriti oil, passion fruit oil, pracaxi oil and solarium oil, and combinations thereof. Forming the water soluble, crosslinkable polysaccharide as a suspension in a carrier liquid, namely a hydrocarbon oil such as mineral oil or vegetable oil, may yield application benefits. Further this may allow for the inclusion of the crosslinking agent within the carrier, that acts to prevent premature crosslinking until the desired introduction, and allows for the simultaneous introduction of both the water soluble, crosslinkable polysaccharide and the crosslinking agent to the waste water stream. Actively mixing the waste water stream and the additives is believed to improve the process when they are introduced simultaneously.

As noted the method of treating a waste water stream according to the present invention may provide that the water soluble, cross-linkable polysaccharide is formed as a suspension in a carrier liquid, namely in a hydrocarbon oil, together with the inclusion of the crosslinking agent, boric acid, such that they may be supplied to the user in a single unit pack that is easily added of the waste water stream. A dry powder formulation incorporating the water soluble, cross-linkable polysaccharide and the cross linking agent is another formulation that allows for a single unit pack to be distributed to the user. A "single unit pack" within the meaning of this application means the water soluble, cross-linkable polysaccharide and the cross linking agent are combined together for the user.

The method of treating a waste water stream according to the invention may provide wherein the water soluble, cross-linkable polysaccharide is placed in an aqueous solution prior to introduction into a waste water stream. This dilution step is generally a matter of process optimization.

While this invention has been particularly shown and described with references to the preferred embodiments thereof, it will be understood by those skilled in the art that various changes in form and details may be made therein without departing from the scope of the invention.

What is claimed is:

1. A method for gelation of a waste water stream comprising the steps of:
    introducing water soluble, crosslinkable polysaccharide into a waste water stream to form a treated stream having an initial liquid content, wherein the waste water stream is a leachate;
    introducing a source of borate ions into the treated stream for crosslinking the polysaccharide; and
    drying the treated stream by an accelerated drying process to remove at least 50% by weight of the initial liquid content in the treated stream, wherein the accelerated drying process includes contacting the treated stream with a heated medium, wherein the step of drying the treated stream includes adding the treated stream to a heated oil bath for a direct heat transfer.

2. The method for gelation of a waste water stream according to claim 1 wherein the leachate is a ground leachate.

3. The method for gelation of a waste water stream according to claim 2 wherein the ground leachate is a landfill leachate.

4. The method for gelation of a waste water stream according to claim 3, wherein the polysaccharide is added into the waste water stream in amounts between about 0.1% and about 10% of the polysaccharide to the weight of the treated stream.

5. The method for gelation of a waste water stream according to claim 3, wherein the polysaccharide is added into the waste water stream in amounts between about 1% and about 3% of the polysaccharide to the weight of the treated stream.

6. The method for gelation of a waste water stream according to claim 3 wherein the water soluble, crosslinkable polysaccharide is one of galactomannan, carrageenan, xanthan gum and combinations thereof.

7. The method for gelation of a waste water stream according to claim 4 wherein the water soluble, crosslinkable polysaccharide includes galactomannan.

8. The method for gelation of a waste water stream according to claim 5 wherein the water soluble, crosslinkable polysaccharide is guaran.

9. The method for gelation of a waste water stream according to claim 8 wherein the water soluble, crosslinkable polysaccharide is formed as a suspension in a carrier liquid.

10. The method for gelation of a waste water stream according to claim 9 wherein the carrier liquid is a hydrocarbon oil.

11. A method for gelation of a landfill leachate waste water stream comprising the steps of:
    introducing water soluble, crosslinkable polysaccharide into a landfill leachate waste water stream to form a treated stream having an initial liquid content wherein the polysaccharide is added into the waste water stream in amounts between about 0.1% and about 10% of the polysaccharide to the weight of the treated stream;
    introducing a source of borate ions into the treated stream for crosslinking the polysaccharide; and
    drying the treated stream to remove at least 50% by weight of the initial liquid content in the treated stream, wherein the drying is an accelerated drying process includes adding the treated stream to a heated oil bath for a direct heat transfer.

12. A method of treating a waste water stream comprising the steps of:
    introducing water soluble, crosslinkable polysaccharide into a waste water stream to form a treated stream having an initial liquid content, wherein the waste water stream is a landfill leachate;
    introducing a source of borate ions into the treated stream for crosslinking the polysaccharide; and
    drying the treated stream by an accelerated drying process to remove at least 50% by weight of the initial liquid content in the treated stream, wherein the accelerated drying process includes contacting the treated stream with a heated medium, wherein the step of drying the treated stream includes adding the treated stream to a heated oil bath for a direct heat transfer.

13. The method of treating a waste water stream according to claim 12 wherein the water soluble, crosslinkable polysaccharide is one of galactomannan, carrageenan, xanthan gum and combinations thereof.

14. The method of treating a waste water stream according to claim 12 wherein the water soluble, crosslinkable polysaccharide is formed as a suspension in a carrier liquid, wherein the carrier liquid is mineral oil and further including the source of borate ions within the carrier liquid.

* * * * *